C. W. VOLNEY.
Improvement in Apparatus for the Treatment of Liquids with Nitric Acid.
No. 125,635.                                Patented April 9, 1872.
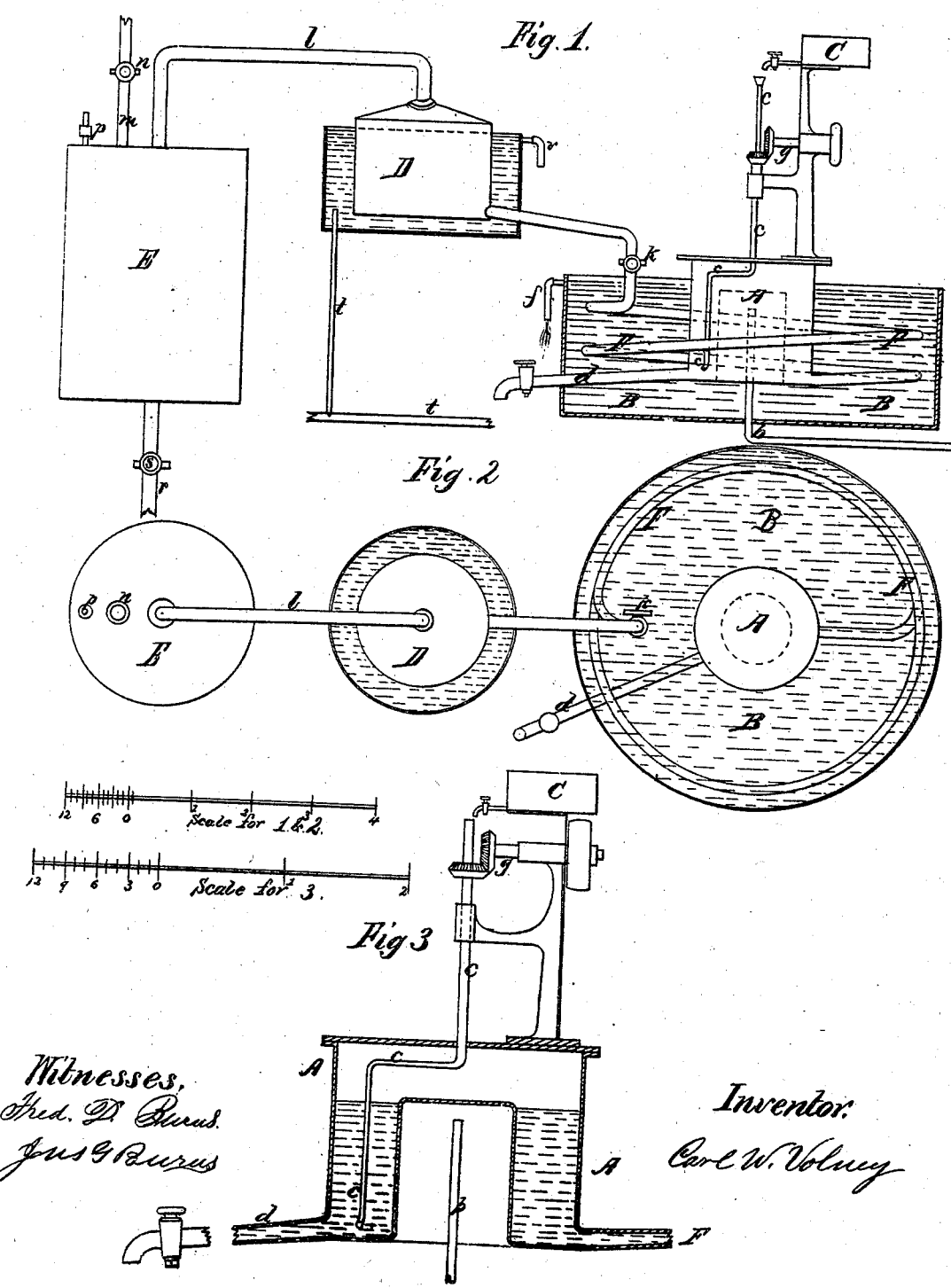

125,635

UNITED STATES PATENT OFFICE.

CARL W. VOLNEY, OF BOSTON, MASSACHUSETTS.

IMPROVEMENT IN APPARATUS FOR THE TREATMENT OF LIQUIDS WITH NITRIC ACID.

Specification forming part of Letters Patent No. 125,635, dated April 9, 1872.

*Improvement in the Manufacture of Nitro-Products and Liquid Nitrates.*

I, CARL W. VOLNEY, of Boston, Massachusetts, citizen of the United States, have invented a new and useful Apparatus for the Treatment of Liquids with Nitric Acid.

The liquids under consideration are: Carbolic acid, phenol, benzole, toluol, glycerine, and those substances chemically termed "alcoholic substances;" and, in treating them with nitric acid, it is intended to manufacture either nitro-products, (such as picric acid and nitro-benzole,) or liquid nitrates, such as nitrate of ethyl or glyceride nitrate.

As this treatment generates heat, which tends to change the products, it is necessary to keep the fluids during the process at a low temperature, which is generally done by cooling the vessel in which the process is effected.

The apparatus invented and used by me consists of two parts, represented in the drawing—Figure I, side elevation; Fig. II, plan. Fig. III is an enlarged sectional view of the injector A of Figs. I and II.

The fluid to be treated with the nitric acid is contained in the square vessel C, made of tin or wood, with faucet through which it can be let off in required quantities into pipe $c\,c\,c$, Figs. I and III, through which pipe $c\,c\,c$ it descends into the cast-iron cylinder A of ring form containing the nitric acid. As seen in the drawing, pipe $c\,c\,c$ is bent at right angles, and can be turned by hand or, as shown in the drawing, by a gear, $g$, Figs. I and III, so as to distribute the descending fluid to the bottom of the annular body of acid in A, changing always the point of contact between acid and liquid. Cylinder A is placed in tub B B, and kept cool by a continual stream of water, which enters through pipe $b$, Figs. I and III, into the inner space of the annular cylinder A, and flowing off at $f$, Fig I.

After having injected liquid until the temperature of the mixture of acid, and liquid in A commences to rise, the whole amount of fluid in cylinder A is drawn off through the coiled pipe F F into cylinder D, Figs. I and II, pipe and cylinder being cooled by running water, thus bringing the heated fluid in contact with a great amount of fresh cooling surface. As soon as the fluid from A has passed the pipe-coil F F it is let back into the annular cylinder A to receive another amount of liquid from C, when the same manipulation of cooling will be repeated. This process is repeated until the acid contained in A has received the proper quantity of liquid from C.

To effect the ascent and descent of the fluid from A, I use a vacuum produced in the third cylinder E, Figs. I and II, which is hermetically connected with D, and, by means of D and coil-pipe F F, with the acid-fluid in A. When E, through pipe $m$ and cock $n$, is filled with water, and then $n$ and the air-valve $p$ closed, a vacuum, and, consequently, ascending of the acid-fluid from A, will be effected as soon as the lower cock $s$ of cylinder E is opened; closing cock $s$, opening air-valve $p$ and water-valve $n$, cylinder E will fill with water, and the acid-fluid will descend from cylinder D into annular cylinder A, where it is ready to receive another quantity of liquid from the reservoir C.

The vacuum may also be produced by exhausters or air-pumps; but, when a sufficient supply of water is at hand, I use the apparatus as above described.

The annular cylinder A, cooling-pipe F F, and cylinder D are made of cast iron, which sufficiently resists the action of the acid.

As seen by this description, I effect the cooling not in the vessel where the two substances—nitric acid and one of the above-named liquids—are brought in contact with each other, because the whole body of fluid, and also the vessel which contains them, is rapidly heated, and it requires hours to cool them effectually, and, on this account, frequently loss cannot be avoided; but I take, as soon as the temperature rises, the fluid through a system of coolers, thus keeping effectually the chemical process in the required limits, and let it return, after cooling, to receive fresh quantities of the liquid to be treated with the acid.

I claim as my invention—

The alternate cooling, ascending, and descending of the acid-fluid, separately from the vessel where nitric acid is brought in contact with one of the above-named substances, substantially as described.

CARL W. VOLNEY.

Witnessed by—
 FRED. D. BURNS,
 JAS. G. BURNS.